US012784262B2

(12) United States Patent
Gopa et al.

(10) Patent No.: US 12,784,262 B2
(45) Date of Patent: Nov. 3, 2026

(54) LOCALIZING A FIFTH WHEEL HITCH COUPLER OF A MOTOR VEHICLE

(71) Applicant: Connaught Electronics Ltd., Tuam (IE)

(72) Inventors: Narmatha Gopa, Chennai (IN); Ana Robleda, Tuam (IE)

( * ) Notice: Subject to any disclaimer, the term of this patent is extended or adjusted under 35 U.S.C. 154(b) by 399 days.

(21) Appl. No.: 18/365,545

(22) Filed: Aug. 4, 2023

(65) Prior Publication Data

US 2024/0046509 A1 Feb. 8, 2024

(30) Foreign Application Priority Data

Aug. 5, 2022 (DE) ......................... 102022119707.7

(51) Int. Cl.

| | |
|---|---|
| ***G01C 22/00*** | (2006.01) |
| ***B60W 30/18*** | (2012.01) |
| ***G06T 7/13*** | (2017.01) |
| ***G06T 7/64*** | (2017.01) |
| ***G06T 7/68*** | (2017.01) |
| ***G06T 7/73*** | (2017.01) |
| *G06V 20/56* | (2022.01) |

(52) U.S. Cl.
CPC ......... *G06T 7/73* (2017.01); *B60W 30/18036* (2013.01); *G06T 7/13* (2017.01); *G06T 7/64* (2017.01); *G06T 7/68* (2017.01); *B60W 2420/403* (2013.01); *G06T 2207/30252* (2013.01); *G06V 20/56* (2022.01)

(58) Field of Classification Search
CPC .... G06T 7/73; G06T 7/64; G06T 7/68; G06T 7/13; G06T 2207/30252; B60W 30/18036; B60W 2420/403; G06V 20/56
See application file for complete search history.

(56) References Cited

U.S. PATENT DOCUMENTS

| | | | | |
|---|---|---|---|---|
| 11,004,231 | B2 | 5/2021 | Shivamurthy | |
| 2018/0081370 | A1 | 3/2018 | Miller et al. | |
| 2018/0272941 | A1* | 9/2018 | Bliss | B62D 15/0295 |
| 2018/0312112 | A1* | 11/2018 | Lewis | B60R 1/003 |
| 2020/0079165 | A1* | 3/2020 | Niewiadomski | G05D 1/0246 |
| 2023/0410359 | A1* | 12/2023 | Mustafa | G06T 7/74 |

OTHER PUBLICATIONS

Online-Enzyklopadie "Wikipedia", Artikel zum Begriff, Circle Hough Transform vom Nov. 19, 2021, URL: https://en.wikipedia.org/w/index.php?title=Circle_Hough_Transform&odid=1056037781 (4 pages).
German Search Report in corresponding German Application No. 10 2022 119 707.7, dated Mar. 16, 2023 (8 pages).

* cited by examiner

*Primary Examiner* — Adam M Alharbi
(74) *Attorney, Agent, or Firm* — Osha Bergman Watanabe & Burton LLP

(57) ABSTRACT

According to a computer-implemented method for localizing a fifth wheel hitch coupler (3) of a motor vehicle (1), a camera image (8) depicting the hitch coupler (3) is received from a camera (2) of the motor vehicle (1) and a top view image is generated by projecting the camera image (8) to a plane, which is perpendicular to a predefined height axis of the motor vehicle (1). A contour map (13) representing a contour (14) of a coupler throat (4) of the hitch coupler (3) is determined based on the top view image and a two-dimensional in-plane position of the coupler throat (4) is determined by fitting a predefined geometric figure (17) to the contour (14) of the coupler throat (4).

15 Claims, 3 Drawing Sheets

LOCALIZING A FIFTH WHEEL HITCH COUPLER OF A MOTOR VEHICLE

The present invention is directed to a computer-implemented method for localizing a fifth wheel hitch coupler of a motor vehicle, wherein a camera image depicting the hitch coupler is received from a camera of the motor vehicle. The invention is further directed to a method for assisting coupling of a trailer with a fifth wheel hitch coupler of a motor vehicle, to a system for localizing a fifth wheel hitch coupler of a motor vehicle and to a computer program product.

It is known to guide a motor vehicle automatically or semi-automatically towards a trailer in order to couple the trailer with a hitch coupler of the motor vehicle. If the hitch coupler of the motor vehicle comprises a tow ball mounted at the rear end of the motor vehicle, the tow ball's position at the vehicle is usually known. On the other hand, for semi-trucks or vehicles with a cargo bed, so called fifth wheel hitch couplers may be used, which are mounted on the cargo bed. Such fifth wheel hitch couplers may comprise a coupling plate with a coupler throat in which a kingpin of the trailer can be inserted to establish the coupling. By means of fifth wheel hitch couplers, particularly high-towing stability may be achieved.

Especially for light duty trucks with an open cargo bed, fifth wheel hitch couplers may not be originally assembled but may be mounted subsequently. Furthermore, the hitch coupler may be removed if not used to increase the available cargo space and may be mounted again at a later time.

Consequently, in order to achieve a high accuracy and/or reliability when assisting the coupling procedure by means of a driver assistance system or another electronic vehicle guidance system of the motor vehicle, it is desirable to localize the hitch coupler, in particular the coupler throat, reliably and accurately.

It is an objective of the present invention to provide a possibility to localize a fifth wheel hitch coupler, in particular a coupler throat of the fifth wheel hitch coupler, accurately and/or reliably.

This objective is achieved by the respective subject matter of the independent claims. Further implementations and preferred embodiments are subject matter of the dependent claims.

The invention is based on the idea to use a camera image depicting the hitch coupler and transform it into a top-view image to extract a contour of the coupler throat and to fit a predefined geometric figure to the contour in order to find an in-plane position of the coupler throat.

According to an aspect of the invention, a computer-implemented method for localizing a fifth wheel hitch coupler of a motor vehicle, in particular of localizing a coupler throat of the fifth wheel hitch coupler, is provided. According to the computer-implemented method, a camera image depicting the hitch coupler is received from a camera of the motor vehicle. A top view image is generated by projecting the camera image to a plane, which is perpendicular to a predefined height axis of the motor vehicle. A contour map representing a contour of a coupler throat of the hitch coupler is determined based on the top view image. A two-dimensional in-plane position of the coupler throat is determined depending on the contour map by fitting a predefined geometric figure to the contour of the coupler throat.

Unless stated otherwise, all steps of the computer-implemented method may be performed by at least one computing unit, which may also be denoted as a data processing apparatus. In particular, the data processing apparatus comprises at least one processing circuit, which is configured or adapted to perform the steps of the computer-implemented method. For this purpose, the data processing apparatus may for example store a computer program comprising instructions which, when executed by the data processing device, in particular the at least one processing circuit, cause the data processing apparatus to execute the computer-implemented method.

A computing unit may in particular be understood as a data processing device, which comprises processing circuitry. The computing unit can therefore in particular process data to perform computing operations. This may also include operations to perform indexed accesses to a data structure, for example a look-up table, LUT.

In particular, the computing unit may include one or more computers, one or more microcontrollers, and/or one or more integrated circuits, for example, one or more application-specific integrated circuits, ASIC, one or more field-programmable gate arrays, FPGA, and/or one or more systems on a chip, SoC. The computing unit may also include one or more processors, for example one or more microprocessors, one or more central processing units, CPU, one or more graphics processing units, GPU, and/or one or more signal processors, in particular one or more digital signal processors, DSP. The computing unit may also include a physical or a virtual cluster of computers or other of said units.

In various embodiments, the computing unit includes one or more hardware and/or software interfaces and/or one or more memory units.

A memory unit may be implemented as a volatile data memory, for example a dynamic random access memory, DRAM, or a static random access memory, SRAM, or as a non-volatile data memory, for example a read-only memory, ROM, a programmable read-only memory, PROM, an erasable programmable read-only memory, EPROM, an electrically erasable programmable read-only memory, EEPROM, a flash memory or flash EEPROM, a ferroelectric random access memory, FRAM, a magnetoresistive random access memory, MRAM, or a phase-change random access memory, PCRAM.

From each implementation of the computer-implemented method, a corresponding method for localizing a fifth wheel hitch coupler of a motor vehicle, which is not purely computer-implemented, is directly obtained by including an additional method step of generating the camera image by means of the camera.

For example, the motor vehicle may comprise a cargo area, in particular an open cargo bed, and the hitch coupler is mounted on a surface of the cargo area. The cargo area may define an essentially plane surface and the height axis of the motor vehicle may be perpendicular to the surface of the cargo area.

The mounting position and orientation of the camera with respect to the motor vehicle, in particular with respect to the cargo area, is known, for example from a calibration of the camera, in particular an extrinsic calibration of the camera. In particular, extrinsic calibration data of the camera may comprise a pose, that is a position and/or orientation, of the camera in a predefined reference coordinate system, for example a vehicle coordinate system, which may be rigidly connected to the vehicle. Also the orientation of the cargo plane in the reference coordinate system is known. Consequently, the pose of the camera with respect to the cargo area is known as well.

For example, the top view image may be generated by projecting the camera image to the plane perpendicular to the height axis depending on the extrinsic calibration data of the camera. Furthermore, also intrinsic calibration data of the camera may be considered for projecting the camera image to generate the top view image. The intrinsic calibration data may for example include a focal length, an image sensor format, a focal point and/or parameters of a mapping function of the camera.

The hitch coupler comprises a coupler component, for example a coupler plate, which contains the coupler throat. The coupler throat may be an opening, for example a slit-like opening with a rounded end, into which a kingpin of a trailer may be introduced to established the coupling.

The coupler component with the coupler throat may for example be positioned on a pedestal component of the hitch coupler, which is mounted on the vehicle at the cargo area. Consequently, the coupler throat, in particular a center of the coupler throat, has a three-dimensional position, which is defined by a distance from the plane surface of the cargo area, which may also be denoted as a height position of the coupler throat, and a two-dimensional in-plane position in a plane parallel to the surface of the cargo area or, in other words, parallel to the plane into which the camera image is projected to generate the top view image.

The coupler throat may for example comprise an elongated portion with two approximately straight and parallel boundaries. The distance of these boundaries may be considered as a width of the coupler throat. The coupler throat may have a rounded end, which adjoins the elongated portion. A center of the rounded end may be considered as the center of the coupler throat. For example, a boundary of the rounded end may follow approximately a part of a circle line corresponding to circle with a certain center position. The center position of the circle may be considered as the center of the coupler throat. The determined two-dimensional in-plane position of the coupler throat may be a two-dimensional in-plane positon of the center of a corresponding circle line, which results from the fit.

Localizing the fifth wheel hitch coupler may consist of determining the two-dimensional in-plane position of the coupler throat. However, in alternative implementations, localizing the hitch coupler may also comprise determining the height position of the coupler throat.

Fitting the geometric figure to the contour may for example be understood such that one or more parameters defining the geometric figure are selected such that a predefined fitting condition is fulfilled by the resulting geometric figure.

For example, the geometric figure may be a circle line or a part of a circle line. In this case, parameters defining the geometric figure include for example a radius of the circle line and a center position of the circle line. Fitting the geometric figure may then for example comprise finding a radius and a center position for the circle line, which results in a circle line matching the contour or a part of the contour according to predefined conditions.

The contour map may be a two-dimensional map or image showing contours or edges in the top view image. For example, an edge detection algorithm or other image processing algorithms may be used to generate the contour map based on the top view image.

By fitting the geometric figure to the contour of the coupler throat, the coupler throat may be localized in a particularly accurate way for different sizes and exact shapes of the coupler throat.

Furthermore, the method according to the invention may be applied to fifth wheel hitch couplers of different heights and shapes and sizes as targets to be localized. Furthermore, also inputs concerning the hitch coupler from the driver of the motor vehicle are not required.

According to several implementations of the computer-implemented method, the height position of the coupler throat is determined depending on the in-plane position and depending on a predetermined height position of the camera. The height position of the camera is for example given by the extrinsic calibration data of the camera and may for example be given by a distance of the camera from the surface of the cargo area or another reference plane perpendicular to the height axis of the motor vehicle.

For example, a longitudinal position of the hitch coupler along a longitudinal axis of the vehicle, which is perpendicular to the height axis, may be predetermined. For example, the hitch coupler may be mounted at a longitudinal position, which corresponds to a position of a rear axle of the motor vehicle. Also a longitudinal position of the camera may be known, in particular from the extrinsic calibration data. Consequently, the height position of the coupler throat may for example be determined depending on the in-plane position of the coupler throat, the height position of the camera, the predetermined longitudinal position of the hitch coupler and the longitudinal position of the camera.

The height position may be particularly helpful for assisting the coupling of the trailer and the fifth wheel hitch coupler.

According to several implementations, prior to determining the in-plane position, the presence of the hitch coupler in the camera image is validated by applying an object detection algorithm to a predetermined region of interest within the camera image, inside which the hitch coupler is expected. In particular, the presence of the hitch coupler may be validated also prior determining the contour map, for example also prior to generating the top view image.

For example, an approximate position of the hitch coupler may be assumed or known in order to define the region of interest. For example, a certain region around a position of the center of the corresponding axle of the vehicle may be used as a region of interest.

The object detection algorithm may for example be trained according to machine learning. For example, the object detection algorithm may be based on a trained artificial neural network, in particular a trained convolutional neural network, CNN.

For example, in case the object detection algorithm cannot validate the presence of the hitch coupler, the method or an iteration of the method may be aborted without conducting the following steps, in particular determining the in-plane position et cetera. Therefore, computational effort may be reduced in case the hitch coupler is for example occluded by cargo or snow or other objects arranged between the hitch coupler and the camera.

According to several implementations, generating the contour map comprises applying an edge detection algorithm to at least a part of the top view image, for example to the region of interest.

To this end, a conventional edge detection algorithm, which highlights the presence of edges and therefore of the contour of the coupler throat may be used. This increases the reliability of fitting the geometric figure to the contour, for example compared to a fitting based directly on the top view image.

According to several implementations, the geometric figure comprises at least a part of a circle line.

A circle line is defined by the center of the corresponding circle and the radius of the corresponding circle. Therefore, fitting the circle line is of low complexity. Furthermore, the rounded end of the coupler throat may have an approximately circular boundary.

Fitting the part of the circle line to the contour of the coupler throat may then be understood as to identify a center position of the circle line, which matches the contour according to the predefined conditions. The two-dimensional in-plane position of the coupler throat may then be given by a respective two-dimensional in-plane position of the center of the circle line.

According to several implementations, fitting the geometric figure to the contour of the coupler throat comprises fitting a circle center of the circle line and/or fitting a circle radius of the circle line to the contour of the coupler throat.

According to several implementations, for each of a plurality of predefined values for the circle radius, a scan area is determined depending on the contour of the coupler throat and the respective value for the circle radius. Fitting the geometric figure to the contour comprises varying the circle center within the respective scan area for each of the plurality of values for the circle radius.

Therein, the scan area may be understood as a two-dimensional part of the plane into which the camera image is projected to generate the top view image. For varying the circle center, the circle center may assume all positions within the scan area on a predefined discrete grid.

The scan area may for example be determined depending on the respective value for the circle radius and the width of the coupler throat, in particular the elongated portion. Therein, the width may for example be extracted from the contour map. The width may for example be a distance between two approximately straight portions of the contour corresponding to the elongated portion of the coupler throat.

By scanning the respective scan area for each of the plurality of values for the circle radius, a large number of combinations of circle radius and circle center are considered for fitting the geometric figure. Therefore, the chance to find the best-fitting circle line is improved.

According to several implementations, for each of the plurality of values for the circle radius and for each of a plurality of positions for the circle center within the respective scan area, at least one rating score is computed depending on the respective value of the circle radius and the respective position of the circle center. Fitting the geometric figure to the contour comprises selecting one of the plurality of predefined values for the circle radius and one of the plurality of positions for the circle center within the respective scan area depending on the at least one rating score of all computed rating scores.

The selected position for the circle center may then be considered as the two-dimensional in-plane position of the coupler throat.

The rating score may for example be a measure, how well the circle line with the corresponding circle radius and circle center matches the contour. The best-fitting combination of circle radius and circle center position may then be used to determine the in-plane position of the coupler throat.

According to several implementations, the at least one rating score comprises an intensity rating score, which depends on a sum of pixel values of the contour map for all pixel positions, which lie on the part of the respective circle line defined by the respective positon of the circle center and the respective value of the circle radius.

For example, in the contour map, pixels which do not lie close to an edge may have a lower pixel value, while pixels at an edge may have a higher pixel value. Furthermore, the sharper the edge, the higher may be the pixel value. However, the details may differ depending on the edge detection algorithm used. The intensity rating score may therefore reflect the probability that the circle line actually lies at the boundary of the coupler throat.

For example, the intensity rating score may be given by the sum of pixel values of the contour map for pixel positions, which lie on the part of the respective circle line multiplied with a normalization factor.

According to several implementations, the at least one rating score comprises a symmetry rating score, which depends on a mirror symmetry of the contour of the coupler throat.

For example, the circle line may be split into two parts either of them lying on a respective side of the predefined mirror plane, which is for example perpendicular to the projection plane of the top view image and approximately parallel to the boundaries of the elongated portion of the coupler throat. Then, as described for the intensity rating score, for each of the split parts, a sum of pixel values of the contour map for pixel positions lying on the split part of the circle line may be computed. The ratio of the two sums may then reflect the symmetry of the contour of the coupler throat. However, also other possibilities to quantify the symmetry rating score are conceivable. For example, the ratio of one of the sums with respect to the corresponding sum over both parts of the circle line may reflect the symmetry of the contour of the coupler throat.

Apart from the location of the boundary of the contour, the symmetry of the contour is a meaningful measure to rate the matching of the corresponding circle line. Consequently, by taking into account the intensity rating score as well as the symmetry rating score for computing the at least one rating score, the reliability of the method may be improved.

According to several implementations, the at least one rating score comprises a combined score, which is given by a weighted sum of the intensity rating score and the symmetry rating score.

For example, a weighting factor for the symmetry rating score may be smaller than a weighting factor for the intensity rating score.

According to several implementations, the one of the plurality of values for the circle radius and the one of the plurality of positions for the circle center within the respective scan area are selected, if at least one predefined condition is fulfilled.

For example, the at least one condition is fulfilled only if the respective combined score is greater than a predefined first threshold value.

By excluding circle lines, which lead to combined scores smaller than the first threshold value, false positive detections may be avoided.

Alternatively or in addition, the at least one condition is fulfilled only if the respective combined score is maximum for all of the plurality of values for the circle radius and all of the plurality of positions for the circle center within the respective scan area.

In other words, the combined score is computed for all positions for the circle center in the respective scan area for the respective circle radius for all circle radius and the circle line yielding the maximum combined score is selected. In this way, the probability for false positive detections is also reduced.

Alternatively or in addition, the at least one condition is fulfilled only if the respective symmetry rating score is greater than a predefined second threshold value.

Consequently, circle lines corresponding to two asymmetric intensities are excluded as well. Also therefore the probability for false positive detections is reduced.

Alternatively or in addition, the at least one condition is fulfilled only if all pixel values of the contour map within a predefined environment of the respective circle line are smaller than a predefined third threshold value.

In this way, circle lines which have a high amount of noise in their environment are excluded. Also in this way, false positive detections may be avoided.

In case that more than one of said conditions are used, it may happen that the at least one condition is not fulfilled for any of the plurality of circle radius and the corresponding positions of the circle center. In this case, the method or a cycle of the method may be aborted without determining the in-plane position for the hitch coupler based on the current camera image. For example, the corresponding steps may be repeated with a further camera image and/or at a later time. For example, in case of bad weather conditions or lighting conditions, the quality of the camera image may be not sufficient to achieve a reliable localization of the hitch coupler. At a later time or under different conditions, the reliability may be improved. Furthermore, also perturbations or temporarily occurring noise in the camera image may be handled in this way.

For use cases or use situations which may arise in the method according to the invention and which are not explicitly described here, it may be provided that, in accordance with the method, an error message and/or a prompt for user feedback is output and/or a default setting and/or a predetermined initial state is set.

According to a further aspect of the invention, a data processing device, which is adapted to carry out a computer-implemented method according to the invention is provided. In particular, the data-processing device may contain one or more processing circuits or computing units adapted to carry out the computer-implemented method.

According to a further aspect of the invention, a method for assisting coupling of a trailer with a fifth wheel hitch coupler of a motor vehicle is provided. Therein, a computer-implemented method for localizing the fifth wheel hitch coupler of the motor vehicle according to the invention is carried out, in particular by an electronic vehicle guidance system of the vehicle, for example by at least one computing unit of the electronic vehicle guidance system. The motor vehicle is guided at least in part automatically towards the trailer depending on a result of the localization of the coupler throat, in particular depending on the two-dimensional in-plane position of the coupler throat and/or the height position of the coupler throat.

Guiding the vehicle at least in part automatically towards the trailer may for example comprise generating a warning and/or information signal or displaying information for assisting a driver of the motor vehicle. In other implementations, guiding the vehicle at least in part automatically towards the trailer may comprise generating one or more control signals for respective actuators of the motor vehicle to cause the motor vehicle to drive towards the trailer automatically or semi-automatically.

According to a further aspect of the invention, a system for localizing a fifth wheel hitch coupler of a motor vehicle is provided. The system comprising a camera for the motor vehicle, which is configured to generate a camera image depicting the hitch coupler. The system comprises at least one computing unit, which is configured to generate a top view image by projecting the camera image to a plane, which is perpendicular to a predefined height axis of the motor vehicle. The at least one computing unit is configured to determine a contour map representing a contour of a coupler throat of the hitch coupler based on the top view image and to determine a two-dimensional in-plane position of the coupler throat by fitting a predefined geometric figure to the contour of the coupler throat.

Further implementations of the system according to the invention follow directly from the various embodiments of the computer-implemented method for localizing a fifth wheel hitch coupler according to the invention and vice versa. In particular, individual features and corresponding explanations as well as advantages relating to the various implementations of the computer-implemented method according to the invention can be transferred analogously to corresponding implementations of the system according to the invention. In particular, the system according to the invention is designed or programmed to carry out the computer-implemented method according to the invention. In particular, the system according to the invention carries out the computer-implemented method according to the invention.

According to a further aspect of the invention, also an electronic vehicle guidance system for a vehicle is provided. The electronic vehicle guidance system comprises a system for localizing a fifth wheel hitch coupler according to the invention. The electronic vehicle guidance system is configured to carry out for assisting coupling of a trailer with a fifth wheel hitch coupler of a motor vehicle according to the invention.

An electronic vehicle guidance system may be understood as an electronic system, configured to guide a vehicle in a fully automated or a fully autonomous manner and, in particular, without a manual intervention or control by a driver or user of the vehicle being necessary. The vehicle carries out all required functions, such as steering maneuvers, deceleration maneuvers and/or acceleration maneuvers as well as monitoring and recording the road traffic and corresponding reactions automatically. In particular, the electronic vehicle guidance system may implement a fully automatic or fully autonomous driving mode according to level 5 of the SAE J3016 classification. An electronic vehicle guidance system may also be implemented as an advanced driver assistance system, ADAS, assisting a driver for partially automatic or partially autonomous driving. In particular, the electronic vehicle guidance system may implement a partly automatic or partly autonomous driving mode according to levels 1 to 4 of the SAE J3016 classification. Here and in the following, SAE J3016 refers to the respective standard dated June 2018.

Guiding the vehicle at least in part automatically may therefore comprise guiding the vehicle according to a fully automatic or fully autonomous driving mode according to level 5 of the SAE J3016 classification. Guiding the vehicle at least in part automatically may also comprise guiding the vehicle according to a partly automatic or partly autonomous driving mode according to levels 1 to 4 of the SAE J3016 classification.

According to a further aspect of the invention, a first computer program comprising first instructions is provided. When executed by a data processing device, the first instructions cause the data processing device to carry out a computer-implemented method for localizing a fifth wheel hitch coupler according to the invention.

According to the invention, also a second computer program is provided, which comprises second instructions. When the second instructions are carried out by an electronic vehicle guidance system according to the invention, in particular by the at least one computing unit of the electronic vehicle guidance system, the second Instructions cause the electronic vehicle guidance system to carry out a method for assisting coupling a trailer with a fifth wheel hitch coupler of a motor vehicle according to the invention.

According to a further aspect of the invention, a computer-readable storage medium is provided, which stores a first computer program and/or a second computer program according to the invention.

The computer-readable storage medium as well as the first and the second computer program may be considered as respective computer program products comprising the first and/or the second instructions, respectively.

Further features of the invention are apparent from the claims, the figures and the figure description. The features and combinations of features mentioned above in the description as well as the features and combinations of features mentioned below in the description of figures and/or shown in the figures may be comprised by the invention not only in the respective combination stated, but also in other combinations. In particular, embodiments and combinations of features, which do not have all the features of an originally formulated claim, may also be comprised by the invention. Moreover, embodiments and combinations of features which go beyond or deviate from the combinations of features set forth in the recitations of the claims may be comprised by the invention.

In the following, the invention will be explained in detail with reference to specific exemplary implementations and respective schematic drawings. In the drawings, identical or functionally identical elements may be denoted by the same reference signs. The description of identical or functionally identical elements is not necessarily repeated with respect to different figures.

In the figures.

Figure 1:
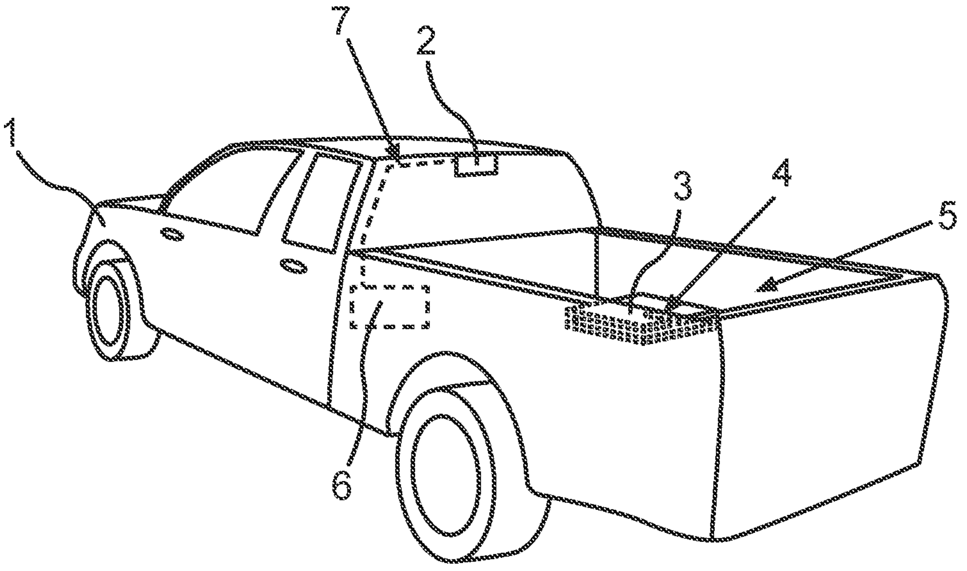
FIG. 1 shows schematically a motor vehicle with a fifth wheel hitch coupler and an exemplary implementation of a system for localizing the fifth wheel hitch coupler according to the invention.

FIG. 1 shows schematically a motor vehicle 1 with a cargo bed 5 and a fifth wheel hitch coupler 3 mounted on a surface of the cargo bed 5 as well as an exemplary implementation of a system 7 for localizing the fifth wheel hitch coupler 3 according to the invention.

The system 7 comprises a camera 2 of the motor vehicle 1, in particular a rear-facing camera, wherein the cargo bed 5 is at least in part positioned in the field of view of the camera 2. For example, a so-called center high-mounted stop lamp camera, CHMSL-camera, may be used as the camera 2. The system 7 further comprises a computing unit 6, which is adapted to carry out an exemplary implementation of a computer-implemented method for localizing the fifth wheel hitch coupler 3 according to the invention.

Figure 2:
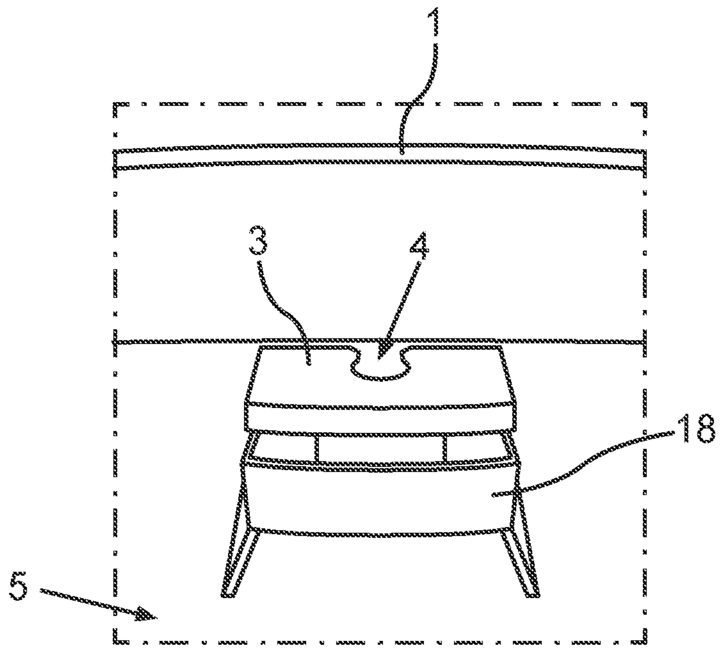
FIG. 2 shows the hitch coupler of the vehicle of FIG. 1 in more detail.

FIG. 2 shows the hitch coupler 3 of the vehicle 1 in more detail. For example, the hitch coupler may contain a pedestal 18 mounted on the surface of the cargo bed 5 and a coupler component on top of the pedestal 18, which comprises a coupler throat 4. The coupler component with the coupler throat 4 may for example be essentially U-shaped. The coupler throat 4 may have the shape of a slit with an elongated portion and a rounded end into which a kingpin of a trailer (not shown) may be inserted to establish coupling between the motor vehicle 1 and the trailer.

According to the computer-implemented method, the computing unit 6 receives a camera image 8 from the camera 2 or a series of subsequent camera images of a camera image stream. The computing unit 6 generates a top view image by projecting the camera image 8 to a plane, which is perpendicular to a pre-defined height axis of the motor vehicle and determines a contour map 13 representing a contour 14 of the coupler throat 4 based on the top view image. The computing unit 6 determines a two-dimensional in-plane position of the coupler throat 4 by fitting a predefined geometric FIG. 17, for example a circle, to the contour 14 of the coupler throat 4.

In some implementations, the computing unit 6 determines a height position of the coupler throat 4 depending on the in-plane position of the coupler throat 4 and depending on a predetermined height position of the camera 2. The computing unit 6 may further use mechanical data of the motor vehicle, such as a mounting position of the coupler throat 4 with respect to a rear axle of the motor vehicle 1 and extrinsic calibration data 9*b* of the camera 2, in particular a mounting positon of the camera 2 with respect to the vehicle 1, for example the rear axle, in order to compute the height position.

Further details of the computer-implemented method are explained referring to specific implementations with reference to FIG. 3, FIG. 4, FIG. 5 and FIG. 6 in the following.

Figure 3:
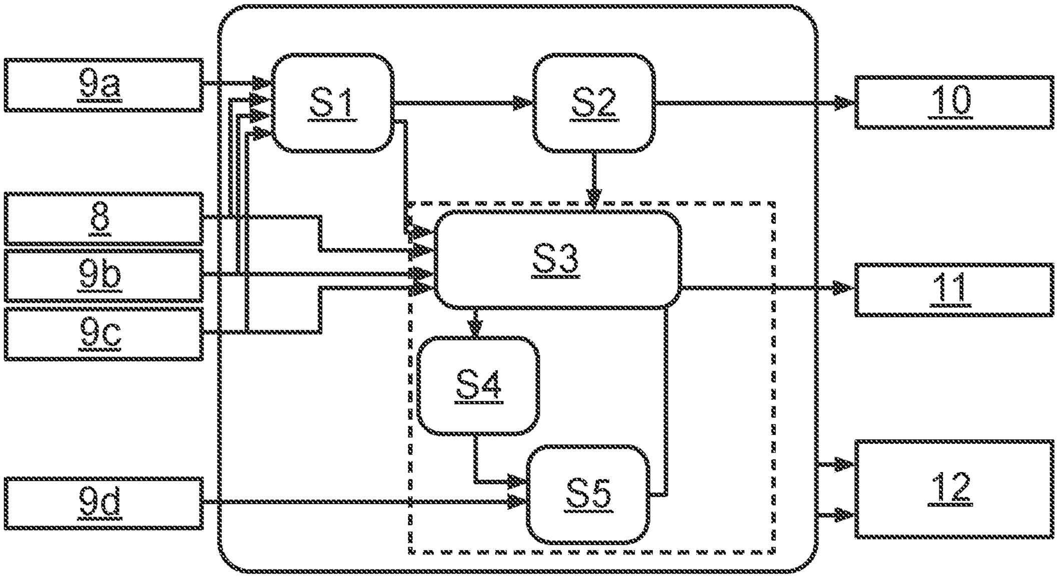
FIG. 3 shows a block diagram of an exemplary implementation of a computer-implemented method for localizing a fifth wheel hitch coupler according to the invention.

FIG. 3 shows a schematic block diagram of an algorithm for carrying out a computer-implemented method for localizing the fifth wheel hitch coupler 3 according to the invention.

Step S1 is optional and corresponds to a step for computing a region of interest, ROI. In this step, the ROI, where the hitch coupler 3 is expected in the camera image 8, is estimated depending on mechanical coupler data 9*a* of the hitch coupler 3, such as a predefined range for the height of the hitch coupler 3, a predefined range for a width and/or a predefined range for a length of the hitch coupler 3. Furthermore, for computing the ROI, mechanical vehicle data 9*c*, such as a center position of a rear axle of the vehicle 1 may be used.

In particular, the position of the hitch coupler 3 may be such that the center of the coupler throat 4 is positioned over a lateral center of the rear axle of the vehicle 1. Consequently, mechanical stability when coupling the trailer is improved. The information regarding center of the coupler throat 4 with respect to the rear axle may also be used for estimating the ROI. In implementations where step S1 is omitted, the whole camera image may be used instead of the ROI.

In a further optional step S2, an object detection algorithm may be applied to the ROI or the camera image in order to verify the presence of the hitch coupler 3 in the camera image 8. As a result of step S2, a first output 10 of the algorithm may be generated, which indicates whether or not the presence of the hitch coupler 3 in the camera image 8 has been verified. If this is not the case, said steps may be repeated for further camera images. On the other hand, if the presence of the hitch coupler 3 has been verified, the top view image may be generated in step S3 as described. Then, in step S4, the contour map 13 is generated and in step S5 the two-dimensional in-plane position of the coupler throat 4 is determined as described.

As a second output 11 of the algorithm or the method, respectively, the two-dimensional in-plane position and/or the height positon of the hitch coupler may be provided.

Further optional outputs 12, such as an algorithm status or a general status of the method may be provided, for example depending on whether an error has occurred, the algorithm is running or the algorithm has ended et cetera.

For verifying the presence of the hitch coupler 3 in step S2, for example a trained CNN, which is trained to specifically look for the presence of the hitch coupler 3 over the cargo bed 5 may be used. In case step S1 is carried out, the ROI may be given as an input to the CNN, otherwise the whole camera image 8 may be used. In case of a CMYK image, the CNN may for example use only the Y-channel to reduce the computational complexity. To be able to handle arbitrary image sizes, the images may be scaled to a fixed size to avoid multiple re-sizing and to provide a unified input to the CNN.

By generating the top view image in step S3, artifacts due to the camera perspective or caused by distortions may be removed or reduced. A height to set the top view plane may be given by the height position of the camera with respect to the cargo bed 5.

For generating the contour map 13 in step S4, an edge detection algorithm may be applied to the camera image 8 or, if applicable, to the ROI in the top view image.

In some implementations, generating the top view image may also comprise averaging the respective individual top view images of two or more camera images 8, in particular subsequent camera images 8. This may improve the performance under varying lighting conditions. After the averaging, the results may be Gaussian blurred in order to reduce noise.

The edges may be considered to consist of pixels at which a significant variation of the luminosity of the final top view image is present. Vertical and horizontal edges may be found by calculating X and Y components of the luminosity gradient, which may be calculated by using Sobel operators. Very high and very low intensity pixels may be filtered based on a gradient direction. All pixels that overcome a predefined threshold may be considered as belonging to an edge. However, also other kinds of edge detection algorithms may be used. The edges may also be labelled, wherein zero may be used for every pixel in the absence of an edge and all other connected edges may be labelled with a non-zero ID.

Figure 4:
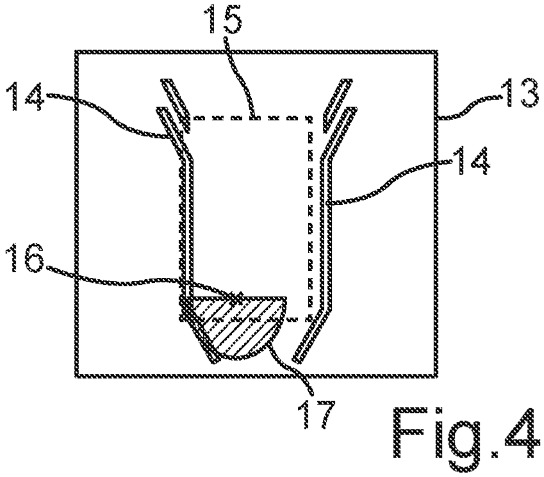
FIG. 4 shows an example of a contour map of a coupler throat.
Figure 5:
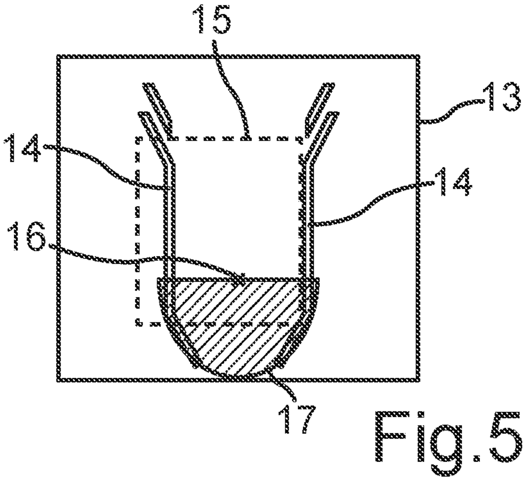
FIG. 5 shows a further example of a contour map of a coupler throat.
Figure 6:
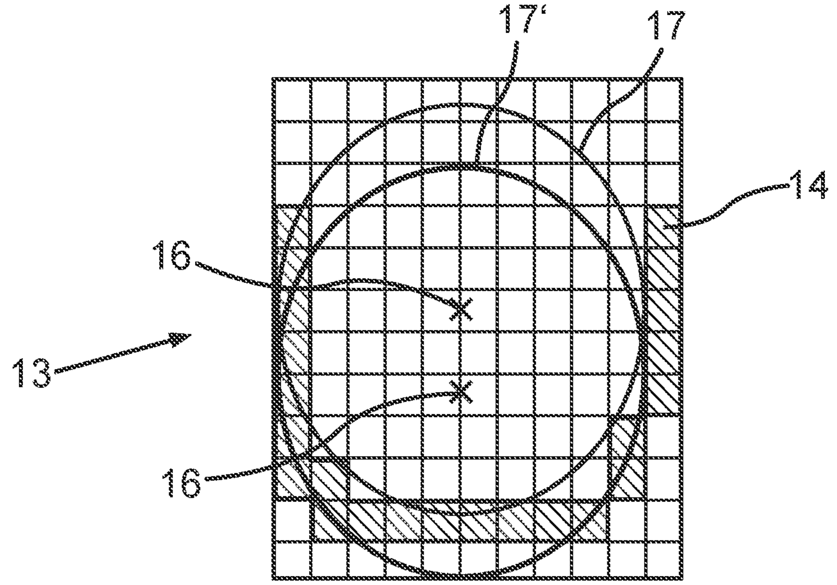
FIG. 6 shows a further example of a contour map of a coupler throat.

Step S5 may then use the contour 14 of the contour map 13, as shown in FIG. 4, FIG. 5 and FIG. 6 and a predefined plurality of circle radii 9*d* to localize the coupler throat 4. As shown by FIG. 4 to FIG. 6, a circle fit methodology may be used to find the center of the hitch coupler throat 4 by varying the radius to find the circle that best fits the contour 14.

For example, a Hough-transform technique may be used to find imperfect instances of circles within a contour by a voting procedure. For each radius and contour patch width, a respective scan area 15 may be build. The center position 16 of the circle 17 may be scanned within the scan area 15. This may be carried out for each of the plurality of circle radii 9*d* and for each combination of circle radius and center position 16, a rating score S may be computed.

FIG. 4 shows an example for the circle radius, which is significantly smaller than the radius of the contour 14, while in FIG. 5, the approximately correct radius is used. FIG. 6 shows two circles 17, 17' with the same radius but different center positions 16, 16' respectively.

The rating score S may for example be computed depending on an intensity rating score $S_i$ and a symmetry rating score $S_s$. For example, S may be given as a weighted sum of $S_i$ and $S_s$, for example $S=0.8\ S_i+0.2\ S_s$.

$S_i$ corresponds for example to the pixel integration over the circle arc of the current radius, wherein the angles may be restricted to a certain predefined angle or range. The sum may be normalized by a constant, which represents the maximum total intensity for the half circle of the respective radius, such that $$S_i = \frac{\sum P_{R,C}(\theta_i)}{\pi R I_{max}}$$

This normalization permits to compare the intensity rating score $S_i$ over circle with different radii. The symmetry rating score $S_s$ measures the contour symmetry of the contour 14. The actual coupler throat 4 is expected to be mirror symmetric, so the best circle is expected to fit both sides of the coupler throat 4. The symmetry rating score $S_s$ may be given by the ratio between the sum of the left part and the total intensity sum, such that $$S_s = 1 - \left|0.5 - \frac{\sum' P_{R,C}(\theta_i)}{\sum P_{R,C}(\theta_i)}\right| = 1 - \left|0.5 - \frac{S_{i,left}}{S_i}\right|$$

The better the circle fits both sides, the closer the symmetry rating score $S_s$ is to 1. If the circle fits only one side, the symmetry rating score $S_s$ is approximately 0.5.

The best circle fit may for example fulfil the following conditions:

1. The score S must be higher than a predefined first threshold value
2. The symmetry rating score $S_s$ must be greater than a predefined second threshold value
3. The respective circle must not have particularly high intensity contour pixels in its immediate environment
4. The circle must have the maximum score S compared to all other circles.

For example, the height position of the coupler throat 4 may be estimated by a vector representation of the 3D line equation wherein the view part pixel is mapped to the camera pixel from which the world point is estimated by re-projecting the camera point onto a vertical plane. The position of the coupler throat 4 is estimated by using the vector representation of a line in 3D. This may be given by $$[P]=[P0]+d*[D],$$

wherein [D] is the direction vector, [P0] is a reference point on the line, [P] is the resultant point and d a the scalar value of distance along the line from the reference point [P0].

Assuming the circle center of the hitch coupler throat 4 is at the rear axle with the known world ray X and reference camera position, the scalar value d may be computed. Hence, d=([X]−[X0])/[Dx], wherein [X] is an axial distance, [X0] is the x-position of the camera 2 and [Dx] the world ray x-component found by re-projection. Substituting d back to the equation, the world ray y-component and world ray z-component are found as [Y]=[Y0]−d*[Dy] and [Z]=[Z0]−d*[Dz].

The final result may be refined by means of different techniques in some implementations. For example, the camera 2 may provide a camera image 8 at each of subsequent frames. For each of the frames, the height position may be computed as described. A mean value may be computed by averaging the height over a plurality of frames and/or a medium value may be computed over a window of a plurality of frames and/or a mean absolute deviation, MAD, may be computed.

As described, in particular with respect to the figures, according to the invention the fifth wheel hitch coupler of a motor vehicle may be localized with improved accuracy and reliability.

In several implementations, a way of confirming the presence of the coupler over the cargo bed is combined with the estimation of the height position of the hitch coupler. For example, once the presence of the hitch coupler has been verified, the hitch coupler may be localized further.

Advantages of the various implementations of the invention include that there are no dependencies on the actual implementation of the target to be detected and no dependency is on data to be provided by a driver of the motor vehicle. Localizing the position of the fifth wheel hitch coupler may be used for improved automatic hitching of trailer vehicles or for driver assistance.

The invention claimed is:

1. A computer-implemented method for localizing a fifth wheel hitch coupler of a motor vehicle, the method comprising:
- receiving a camera image depicting the fifth wheel hitch coupler from a camera of the motor vehicle, wherein the motor vehicle comprises a cargo area and the fifth wheel hitch coupler is mounted on a surface of the cargo area;
- generating a top view image by projecting the camera image to a plane, which is perpendicular to a predefined height axis of the motor vehicle;
- determining a contour map representing a contour of a coupler throat of the fifth wheel hitch coupler based on the top view image; and
- determining a two-dimensional in-plane position of the coupler throat is determined by fitting a predefined geometric figure to the contour of the coupler throat.

2. The computer-implemented method according to claim 1, wherein prior to determining the in-plane position, the presence of the fifth wheel hitch coupler in the camera image is validated by applying an object detection algorithm to a predetermined region of interest within the camera image, inside which the fifth wheel hitch coupler is expected.

3. The computer-implemented method according to claim 1, wherein generating the contour map comprises applying an edge detection algorithm to at least a part of the top view image.

4. The computer-implemented method according to claim 1, wherein the geometric figure comprises at least a part of a circle line.

5. The computer-implemented method according to claim 4, wherein fitting the geometric figure to the contour of the coupler throat comprises fitting a circle center of the circle line and/or fitting a circle radius of the circle line.

6. The computer-implemented method according to claim 5, wherein:
- for each of a plurality of predefined values for the circle radius, a scan area is determined depending on the contour of the coupler throat and the respective value for the circle radius, and
- fitting the geometric figure to the contour comprises varying the circle center within the respective scan area for each of the plurality of values for the circle radius.

7. The computer-implemented method according to claim 6, wherein:
- for each of the plurality of values for the circle radius and for each of a plurality of positions for the circle center within the respective scan area, at least one rating score is computed depending on the respective value for the circle radius and the respective position for circle center, and
- fitting the geometric figure to the contour comprises selecting one of the plurality of values for the circle radius and one of the plurality of positions for the circle center within the respective scan area depending on the at least one rating score.

8. The computer-implemented method according claim 7, wherein the at least one rating score comprises an intensity rating score, which depends on a sum of pixel values of the contour map for all pixel positions, which lie on the part of the respective circle line.

9. The computer-implemented method according to claim 8, wherein the at least one rating score comprises a symmetry rating score, which depends on a mirror symmetry of the contour of the coupler throat.

10. The computer-implemented method according to claim 9, wherein the at least one rating score comprises a combined score, which is given by a weighted sum of the intensity rating score and the symmetry rating score.

11. The computer-implemented method according to claim 10, wherein the one of the plurality of values for the circle radius and the one of the plurality of positions for the circle center within the respective scan area are selected, if at least one predefined condition is fulfilled, wherein the at least one condition is fulfilled only if:
- the respective combined score is greater than a predefined first threshold value; and/or
- the respective combined score is maximum for all of the plurality of values for the circle radius and all of the plurality of positions for the circle center; and/or
- the respective symmetry rating score is greater than a predefined second threshold value; and/or
- all pixel values of the contour map within a predefined environment of the respective circle line are smaller than a predefined third threshold value.

12. The computer-implemented method according to claim 1, wherein a height position of the coupler throat is determined depending on the in-plane position and depending on a predetermined height position of the camera.

13. A method for assisting coupling of a trailer with a fifth wheel hitch coupler of a motor vehicle, wherein:
- carrying out a computer-implemented method for localizing the fifth wheel hitch coupler of the motor vehicle according to claim 1; and
- guiding the motor vehicle at least in part automatically towards the trailer depending on a result of the localization of the coupler throat.

14. A system for localizing a fifth wheel hitch coupler of a motor vehicle, the system comprising:
- the motor vehicle comprising a cargo area, wherein the fifth wheel hitch coupler is mounted on a surface of the cargo area;
- a camera for the motor vehicle, which is configured to generate a camera image depicting the fifth wheel hitch coupler;
- at least one computing unit, which is configured to:

generate a top view image by projecting the camera image to a plane, which is perpendicular to a predefined height axis of the motor vehicle;

determine a contour map representing a contour of a coupler throat of the fifth wheel hitch coupler based on the top view image; and determine a two-dimensional in-plane position of the coupler throat by fitting a predefined geometric figure to the contour of the coupler throat.

15. A computer program product comprising instructions, which, when executed by a data processing device, cause the data processing device to carry out a computer-implemented method according claim 1.

* * * * *